March 19, 1963
T. F. TRIBE
3,082,288
WELDING CABLES
Filed Sept. 4, 1959
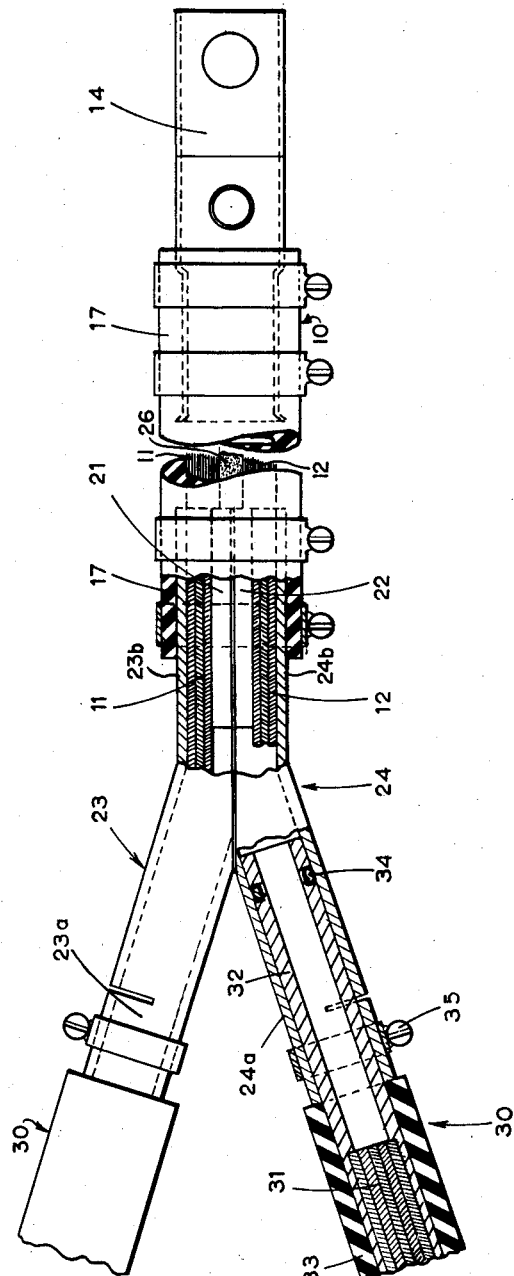
INVENTOR:
THOMAS FRANCIS TRIBE
BY
Richardson, David and Nardon
ATTORNEYS.

3,082,288
WELDING CABLES
Thomas Francis Tribe, Dudley, England, assignor to British Federal Welder & Machine Company Limited, Worcester, England, a British company
Filed Sept. 4, 1959, Ser. No. 838,297
Claims priority, application Great Britain June 3, 1959
2 Claims. (Cl. 174—19)

In the specification of the prior U.S. patent application Serial No. 566,682 there is described a kickless electric cable for welding consisting of two multi-conductor cores encased in a common flexible insulating sheath and seperated by an insulating web within said sheath, said sheath terminating at a predetermined distance from the end of the cable whence the cores are divided by a Y-shaped member to extend individually to terminal heads or connectors said Y-member consisting of a pair of conductor tubes each deformed over a portion of its length to be semi-cylindrical, said semi-cylindrical portions being laid back-to-back with an insulating web between them and inserted into the end of the common insulating sheath and the remaining portion of each conductor tube being cylindrical and inclined at an angle to the semi-cylindrical portion to constitute a fork limb of the Y-member.

In the prior specification, the multi-conductor cores extend from end to end of the cable and thus its use is limited to one particular kind of welding machine or gun.

The present invention provides an improved and simplified arrangement of end cable from the Y-member to the individual welding heads, whereby different lengths of end cables or jumpers may readily be used.

The present invention is characterised by separate jumpers each consisting of a core housed in an insulating sheath and having a cylindrical tubular conductor to which the core and sheath of the jumper cable are attached, the conductor being plugged into one of the cylindrical fork limbs of the Y-junction member.

The plugging-in is effected by the tublar conductors on the jumpers, which are sealed by means of O rings.

The invention is illustrated in the accompanying drawing which is a plan view, broken away and partly in section, of a kickless welding cable assembly, showing the connection of one jumper at the Y-junction member.

The kickless cable 10 consists of the twin cores 11 and 12 housed in a common insulating sheath 17 and connected at one end to terminal connectors, only one of which 14 is shown. Flexible coolant tubes 21 and 22 are shown, which extend along the length of the cores 11, 12 and terminate substantially at the bend of the terminal conductors 23 and 24. Portions 23b, 24b of conductors 23, 24 are laid back-to-back with an insulating web 26 between them.

The cylindrical tubular portions 23a and 24a of the conductors 23, 24 receive the individual separate jumpers, such as 30. Each jumper consists of a multiconductor core 31, secured at its opposite end to a terminal (not shown, but similar to the connector 14) and at its opposite end to a cylindrical copper tubular terminal conductor 32, the core and part of the conductor 32 being enclosed by an insulating sheath 33. The terminal conductor 32 carries an O-ring 34 mounted in a groove in the conductor which is a close telescopic sliding fit within the cylindrical portion 24a, being held therein by an external clip 35. Electrical connection between the cores 12 and 31 is effected through the terminal conductors 24 and 32 and these also constitute conduits for the coolant. The arrangement is the same for cores 11 and 31. The tubular conductors 24 and 32 are continuously cylindrical in the sense that, as seen in the accompanying drawing, a large part of the conductors which are telescoped the one within the other is not slit axially or transversely and it is arranged that the O ring 34 prevents leakage through any slit, if provided. This is obviously essential if the telescoped terminal conductors 24 and 32 are to serve as fluid conduits."

By providing plug-in jumpers it is possible very readily to adjust the cable to different machines, without changing the main length of the cable, and thus great saving in time and material is assured.

I claim:
1. A welding cable assembly having a kickless cable and a jumper cable the kickless cable comprising twin conductor cores, a common insulating sheath for said cores and which constitutes a fluid conduit and an insulating web in said sheath separating said cores, a cylindrical terminal conductor tube electrically connected at one end of each core, said terminal conductor being deformed to semi-circular cross-section wherein contact with the core, the remaining length of the terminal conductor being circular and bent at an angle, said terminal conductors being secured back-to-back with an insulating web between them to provide a Y-junction, the sheath being attached to the stem of the Y-junction and the jumper cable comprising a conductor core, an insulating sheath which envelopes the core and which constitutes a fluid conduit, a cylindrical tubular conductor to one end of which the core is secured and to which the sheath is also attached in fluid-tight manner and a deformable, resilient ring carried by the other end of the tubular conductor of said jumper cable, the jumper-cable conductor being a close telescopic sliding fit within a tubular fork limb of the Y-junction.

2. An electric connector for a pair of welding cables, each of which cables has a core of conducting wires and provides a fluid conduit, said connector comprising, for one cable of the pair of cables, a continuously cylindrical tubular terminal conductor, the core of said one cable being secured to one end of said conductor, an insulating sheath enveloping the core of said one cable and constituting a fluid conduit, said sheath being attached to the conductor in a fluid-tight manner; said connector further comprising, for the other cable of the pair of cables, another continuously cylindrical tubular terminal conductor, the core of said other cable being secured to one end of the other conductor, another insulating sheath enveloping the core of the other cable and constituting another fluid conduit, said other sheath being attached to the other conductor in a fluid-tight manner, the first named conductor having its other end disposed in a close telescopic fit within said other conductor, a deformable, resilient ring carried in a peripheral groove located near the other end of the first named conductor and sealingly engaging the inner surface of said other conductor, and clip means on said other conductor holding both conductors telescoped together.

References Cited in the file of this patent
UNITED STATES PATENTS

| | | |
|---|---|---|
| 2,125,816 | Reynolds | Aug. 2, 1938 |
| 2,214,177 | Raybould | Sept. 10, 1940 |
| 2,264,815 | Thomson | Dec. 2, 1941 |
| 2,371,185 | Purat | Mar. 13, 1945 |
| 2,375,614 | Berger | May 8, 1945 |
| 2,549,264 | Timmins | Apr. 17, 1951 |
| 2,635,132 | Rogoff | Apr. 14, 1953 |
| 2,797,255 | Wreford | June 25, 1957 |